3,796,779
MIXING OF MOLTEN PLASTIC AND GAS
Walter H. Greenberg, Syosset, N.Y., assignor to
  Bischoff Chemical Corporation, Hicksville, N.Y.
Continuation-in-part of abandoned application Ser. No.
  17,246, Mar. 6, 1970. This application Feb. 2, 1972,
  Ser. No. 222,982
          Int. Cl. B29d 27/00; B29f 1/00
U.S. Cl. 264—50                              3 Claims

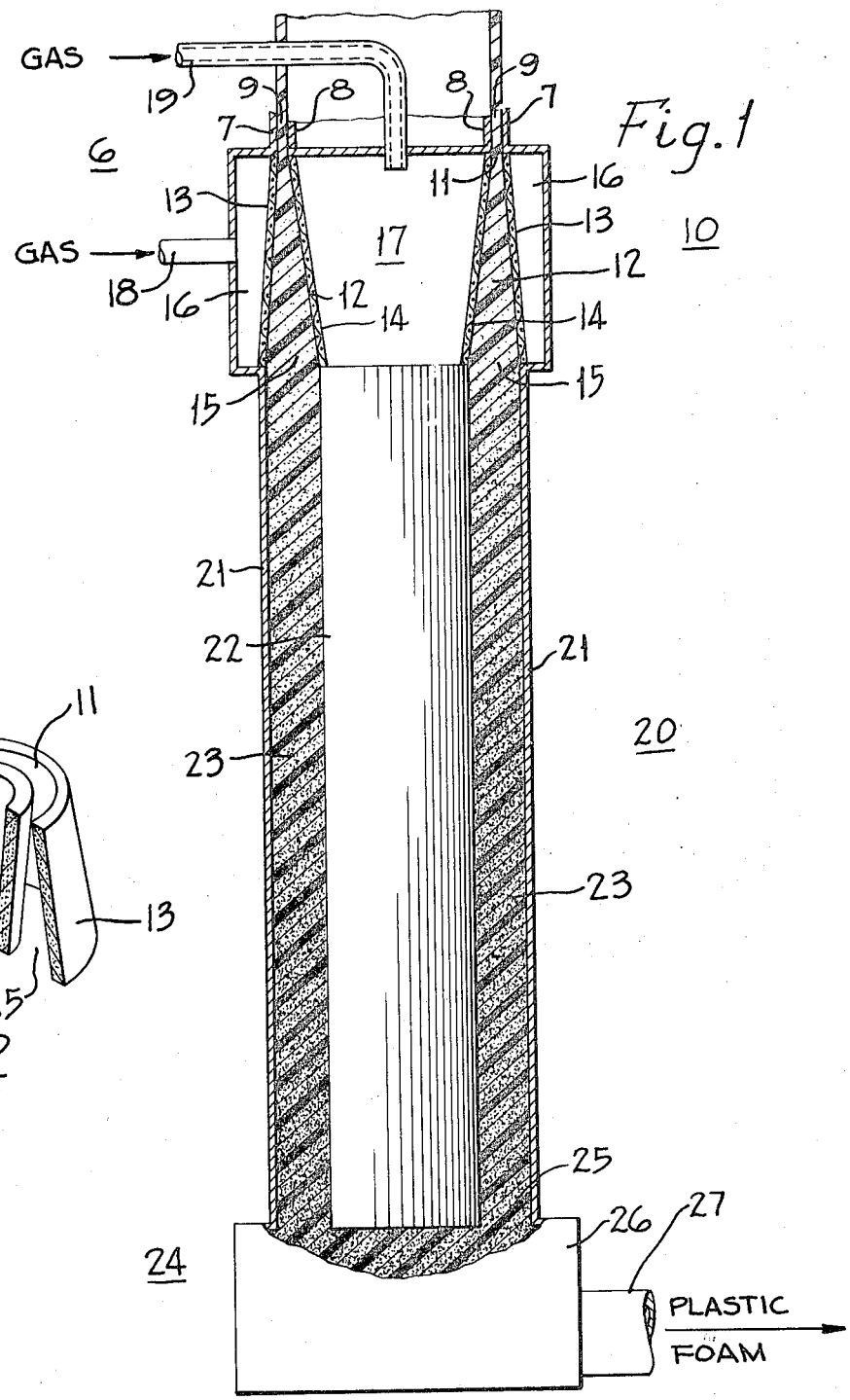

ABSTRACT OF THE DISCLOSURE

Gas is injected into a flowing stream of molten plastic to provide a mixture containing an amount of gas which at ambient conditions would constitute about 10% to about 98% of the volume of the mixture. A relatively thin, large diameter annular stream of molten plastic advances through the mixing zone, the gas being injected into the mixture through at least one of the generally cylindrical walls of the mixing zone. Of particular importance, the gas is injected through a porous wall having more than a thousand openings per square centimeter, such as an ultra-fine sintered glass filter type of gas diffusion member. Each of the walls of the mixing zone is desirably tapered, so that the thickness of the molten cellular plastic effluent is greater than the thickness of the entering stream. The mixture advances through a length of mixing zone which is from about ten to about one hundred times the marginal increase in thickness of the stream. The effluent from the mixing zone flows through a heated stabilization zone which is several times longer than the mixing zone. The stabilized mixture can then be reshaped for flowing into streams utilizing the mixture of molten plastic and gas.

CROSS REFERENCE

This application is a continuation-in-part of Ser. No. 17,246 filed Mar. 6, 1970 and now abandoned. Application Ser. No. 223,022, entitled Mixing of Molten Plastic and Gas, issued as Pat. 3,744,775 on July 10, 1973 is a division of Ser. No. 17,246.

GENERAL BACKGROUND

Many varieties of plastic organic material have been utilized in cellular form, with gas being introduced into the mixture through decomposable blowing agents, through chemical reactions of isocyanates, through high pressure dissolving of the gas, through mechanical agitative whipping of the precursor, and by other techniques. The cost of the high pressure equipment needed for some procedures has been a deterrent to expansion of the use of such procedures. The autocatalytic propensity toward thermal decomposition of molten plastic has tended to discourage mixing of gas and large static volumes of molten plastic. Some characteristics of mixtures of gas and molten plastic have long been recognized, but the industrial utilization of such mixtures has been delayed because of the absence of satisfactory apparatus and methods for producing such mixtures.

SUMMARY OF INVENTION

In accordance with the present invention, a pair of generally vertical but slightly sloped porous walls having more than 1,000 openings per square centimeter, such as an ultra-fine filter or diffusion member prepared from sintered glass, is employed for the injection of gas into a thin film flowing downwardly adjacent such wall as a stream of molten plastic. In an illustrated embodiment, the molten plastic is shaped into an annular film and this stream is advanced through a generally cylindrical mixing zone. The thickness of the mixture leaving the mixing zone, that is, the distance between the walls confining the stream, is desirably greater than the distance between the walls at the entry to the mixing zone, so that the stream increases in thickness as more gas cells are formed therein. After the mixture leaves the mixing zone, it passes through a stabilizing zone several times longer than the mixing zone. The thus stabilized mixture then flows into an accumulating and separating zone for flowing into apparatus appropriate for utilizing the resultant uniform mixture of gas and plastic.

DESCRIPTION OF DRAWINGS

In the drawings, FIG. 1 is a schematic view of a foam generating apparatus. FIG. 2 is a schematic view of a pair of sintered glass surfaces having a porosity of more than 1,000 openings per square centimeter.

DESCRIPTION OF EMBODIMENT

A thermoplastic such as polypropylene is extruded into an annular film describable as a tube. Said tube member flows downwardly through a heating zone until the molten plastic has a viscosity about as low as can be tolerated without an excessive decomposition rate. Such low viscosity molten plastic enters apparatus 6 which is maintained at a hot condition having a range close to the temperature of the molten plastic. The molten plastic initially flows between an outer wall 7 and inner wall 8 as an annular stream 9 and advances downwardly to an orifice 11 at the entry of an expansion zone 10. The features porous surfaces through which gas diffuses, one such surface being an outer cone 13 and the other such surface being an inner cone 14, thus defining an interconal space 12. Each porous surface has more than 1,000 openings per cm.$^2$ such as a sintered glass filter, a filter stone or a fine mesh screen of glass fiber or metal wire. The average size opening is less than 250 microns, and ordinarily the openings are significantly smaller than 250 microns. As the plastic flows downwardly, the gas diffusing through the cones 13, 14 is distributed throughout the molten cellular polypropylene, so that the thickness of the stream is increased significantly during the flow from the entry orifice 11 to the exit 15 of the expansion zone 10. The gas diffusing through cones 13, 14, has a tendency to escape through channels along the boundary of the plastic foam and a wall. A stabilizing zone 20 is adapted to minimize such channelling by providing a downflowing stream of cellular plastic. Such stream flows as an annular tube 23 between an outer wall 21 and inner wall 22. The thus stabilized annular stream of molten cellular polypropylene flows into an accumulating and separating zone 24 comprising of plenum chamber 25 defined by a box 26. Any unabsorbed gas is permitted to escape from said zone 24, so that a useful stream of cellular molten polypropylene can be withdrawn from exit pipe 27. Such stream can be employed in injection molding apparatus.

The pressure at which the gas is supplied is of the magnitude of two atmospheres, so that after the gas has cooled to ambient temperature, the gas cells are at about ambient pressure. The molten plastic is supplied at approximately the same pressure, and the flow of the cellular plastic is partly by gravity and partly by reason of the lower pressure at the exit 27 than at the source of supply of the molten plastic and gas. Propane is a preferred gas for operation of the system, but the system is operable using either gases having ready solubility in hydrocarbons such as difluorodichloromethane, hexafluoroethanes, tetrafluoromethane, ethane, methane, dimethyl ether, carbon dioxide, and the like, or gases having limited solubility in hydrocarbons such as nitrogen, air, argon, and the like. The gas diffusing through the porous surfaces is blown into the molten plastic and the increased distance between the porous surfaces corresponds to the extent of expansion of the flowing stream.

The gas diffusing through the porous surfaces has a minimized tendency to channel through the stabilizing zone for escape from the reshaping zone because the length of the stabilizing zone and the flow of the molten plastic foam therethrough tends to resist such channelling of a gas stream. No large pressure differences exist to necessitate unusual safety precautions. Apparatus utilizing thin walls permits transfer of heat for maintenance of a temperature within a suitable range, the range being so narrow that at the molten plastic temperature, reference can be made to a substantially uniform temperature. Certain advantages arise from cooling the reshaping zone and stabilizing zone enough to increase the ease of retention of the gas cells. Although such cooling tends to increase the viscosity of the polypropylene walls of the gas cells, the effective viscosity of the mixture of gas and plastic remains low so that the cellular plastic can flow through the stabilizing zone and the accumulating and separating zone without a troublesomely large pressure drop. An excessive temperature drop must be avoided because the volume occupied by the gas is approximately proportional to the absolute temperature, and the significant shrinkable attributable to such cooling is scheduled to occur in the injection molding apparatus and mold, and not in the plastic foam generating apparatus. As the pressure of the system decreases, each gas cell tends to expand, thus expanding the plastic foam. Whatever contraction occurs from cooling is substantially compensated for by expansion due to pressure drop, thus maintaining reasonably uniform foam density throughout the stabilizing zone and the accumulating and separating zone.

The use of the annular streams provides significant advantages in simplifying the heat insulation and construction of portions of the stabilizing zone. The invention features the formation of plastic foam by directing a very thin stream of molten plastic of minimized viscosity between two porous surfaces, each having more than 1,000 openings per square centimeter, and gas diffuses through the two porous surfaces into the flowing plastic stream to provide a thicker plastic stream, the gas being pushed through the two porous surfaces at a differential pressure which is less than one atmosphere, the distribution of the gas being controlled by factors such as the thinness of the plastic stream, and the low viscosity of the plastic stream. Automatic controls are desirably employed to assure production of a continuous stream of plastic foam, and to minimize difficulties due to the gas pressure becoming excessive or inadequate or because of the viscosity of the plastic becoming excessively high or excessively low (excessive decomposition rate of plastic). The expansion zone conditions can be controlled to permit production of plastic foam at a rapid rate. Apparatus for making plastic foam is evaluated by engineers on the basis of the capital cost for producing plastic foam at a particular rate in pounds per hour, and the simplicity of the present apparatus for large scale production helps in making it attractive from the standpoint of capital cost.

It should be noted that the apparatus comprises walls adapted to utilize gravitational forces for aiding the flow of the molten plastic into and through the expansion zone, stabilizing zone, and the accumulating and separating zone successively. At the exit of hte expansion zone, the walls are farther apart than at the entrance thereto, and the height of the expansion zone is at least ten times the marginal increase in the distance between the walls. The height of the walls in the stabilizing zone is at least three times the height of the expansion zone. The walls of the stabilizing zone are parallel, non-porous, and the spacing therebetween is the same as the spacing apart of the bottom of the expansion zone walls.

The apparatus and method of the present invention are applicable for all varieties of organic macromolecular structural materials which can be solid at room temperature and which can be melted and maintained as gravitating films during a reasonable period of time such as a minute. Such materials are generally called organic thermoplastic materials, and those thermoplastics which can be heated for gravitating thin film flow include nylon, polystyrene, polycarbonates, polyethylene, polyesters, vinyl acetate, polyvinylpyrrolidones, and copolymers and mixtures in which one of such polymers predominates.

The method can be described as including the steps of advancing a thin stream of molten plastic of low viscosity into an expansion zone, and advancing such stream downwardly while diffusing gas thereinto by tiny bubbles of gas forced into the downwardly moving stream from each side at a small differential pressure whereby the thickness of the downwardly advancing stream increases, the marginal increase of thickness being less than one-tenth the downward travel distance through the expansion zone, advancing the thus thickened stream downwardly for a distance at least three times the travel distance through the expansion zone, and thereafter separating the unabsorbed gas from the stream to provide a uniform stream of the mixture of hot gas and hot molten plastic.

The invention claimed is:

1. The method of preparing a mixture of gas and hot plastic organic thermoplastic material which includes the steps of:

advancing a thin film of an organic thermoplastic polymeric material through a heating zone adapted to melt the film and form a thin stream of hot molten polymeric material, and continuing to heat the polymeric material to a higher temperature to reduce its viscosity without significant degradation;

advancing by gravity said thin stream of hot molten plastic of reduced viscosity in an exactly downward direction through a progressively increasing expansion zone while diffusing gas thereinto by forcing tiny bubbles of gas from both sides of the advancing stream into the stream at a differential pressure which is less than one atmosphere, whereby the thickness of the downwardly advancing stream increases in thickness due to gas expansion, the marginal increase of the thickness of the stream in the expansion zone being less than one-tenth of the downward travel distance through the expansion zone, there being diffusion of gas bubbles from sites corresponding to a concentration of more than 1,000 sites per square centimeter at each side of the stream, substantially each site opening having a linear dimension smaller than 250 microns;

advancing by gravity the thus thickened stream exactly downwardly through a stabilizing zone while maintaining such thickness, the distance of travel through the stabilizing zone being more than three times the distance of travel through the expansion zone, the foam density of the mixture of gas and hot plastic being substantially uniform and the temperature of of said mixture being substantially uniform throughout said stabilizing zone;

advancing by gravity the stream from the stabilizing zone into an accumulating and separating zone wherein any unabsorbed gas is permitted to escape from the stream; and withdrawing said stream of a mixture of gas and hot plastic organic thermoplastic material from the accumulating and separating zone, the temperature of the mixture being substantially uniform with the temperature of the expansion zone.

2. The method of claim 1 in which the thermoplastic is selected from the group consisting of polypropylene, polyethylene, nylon, polystyrene, polycarbonate, polyesters, vinyl acetate, polyvinyl pyrrolidones, and copolymers and mixtures in which one of such polymers predominates.

3. The method of claim 1 in which the thermoplastic material is polypropylene.

References Cited

UNITED STATES PATENTS

| | | | |
|---|---|---|---|
| 2,825,413 | 3/1958 | Williams | 169—15 |
| 3,063,952 | 11/1962 | Vieli | 260—2.5 |
| 3,118,958 | 1/1964 | White | 261—87 |
| 3,122,327 | 2/1964 | Wiedorn | 239—431 |
| 3,251,092 | 5/1966 | Printz | 18—5 |
| 2,935,762 | 5/1960 | Walter et al. | 264—50 |
| 3,316,335 | 4/1967 | Snella et al. | 264—50 |
| 3,368,008 | 2/1968 | Azuma | 264—51 |
| 3,374,300 | 3/1968 | Azuma | 264—53 X |
| 3,466,705 | 9/1969 | Richie | 264—50 X |

PHILIP E. ANDERSON, Primary Examiner

U.S. Cl. X.R.

260—2.5 R, 2.5 HA; 264—329, DIG 5, DIG 13, DIG 83